United States Patent [19]
Jaswal et al.

[11] 4,019,866
[45] Apr. 26, 1977

[54] RECIRCULATING REACTION APPARATUS FOR CONTINUOUS PREPARATION OF A POLYAMIDE

[75] Inventors: Iqbalsingh Jaswal, Copper Cliff; Kalev Pugi, Kingston, both of Canada

[73] Assignee: Du Pont of Canada Limited, Montreal, Canada

[22] Filed: Jan. 10, 1975

[21] Appl. No.: 540,277

Related U.S. Application Data

[62] Division of Ser. No. 392,511, Aug. 29, 1973, Pat. No. 3,900,450.

[30] Foreign Application Priority Data

Mar. 5, 1973 Canada .............................. 165282

[52] U.S. Cl. .................................. 23/260; 23/283
[51] Int. Cl.² ........................................... B01J 1/00
[58] Field of Search ............ 23/260, 283, 284, 285; 260/78 R, 78 L

[56] References Cited

UNITED STATES PATENTS

| | | | |
|---|---|---|---|
| 2,689,839 | 9/1954 | Heckert | 260/78 R X |
| 3,044,993 | 7/1962 | Tiemersa | 260/78 R |
| 3,185,672 | 5/1965 | Clemo et al. | 260/78 R |
| 3,296,217 | 1/1967 | Tate | 260/78 R |
| 3,466,150 | 9/1969 | Dietze et al. | 23/285 |
| 3,513,145 | 5/1970 | Crawford | 23/260 X |
| 3,644,096 | 2/1972 | Lewis et al. | 23/283 UX |

OTHER PUBLICATIONS

A.P.C. Application of Fauser, Ser. No. 306,071, Published Apr. 27, 1943.

*Primary Examiner*—Morris O. Wolk
*Assistant Examiner*—Roger F. Phillips

[57] ABSTRACT

A process and an apparatus for the continuous preparation of a polyamide from polyamide forming reactants. In the process, the reactants are injected continuously into a reaction zone designed to permit rapid heating and uniform mixing. The reactants are heated and uniformly mixed in the reaction zone to form a vapor and a prepolymer. The vapor is separated from the prepolymer and may be vented through a rectifying zone to recover diamine therefrom. The prepolymer is withdrawn from the reaction zone and may be passed to a second reaction zone for further reaction to form a polymer and more vapor which is vented to atmosphere. The apparatus includes a heat exchanger and a separator; the bottom of the separator being connected to the inlet of the heat exchanger by a recirculating loop and the outlet of the heat exchanger being connected to the separator by a nozzle. Recirculation means and means to inject salt solution into the recirculating loop are also included. The recirculating means may comprise a pump or the recirculating means and the heat exchanger may be combined in a vertical thermosyphon reboiler. Control means are included for venting vapor from the separator and a rectification column may be included after the separator to recover diamine from the vapor. A flash valve or a pump and a reactor (either a liquid vapor phase reactor or a flasher) may also be included.

4 Claims, 4 Drawing Figures

RECIRCULATING REACTION APPARATUS FOR CONTINUOUS PREPARATION OF A POLYAMIDE

CROSS REFERENCE TO RELATED APPLICATION

This is a division of application Ser. No. 392,511 filed Aug. 29, 1973, now U.S. Pat. No. 3,900,450.

BACKGROUND OF THE INVENTION

This invention relates to the production of synthetic polyamides and more particularly to a process and apparatus for producing polyamides by the polymerization of aqueous polyamide forming salt solutions in a continuous process.

The synthetic linear polyamides prepared in the practice of this invention are of the general type described in U.S. Pat. Nos. 2,071,250; 2,071,253; 2,130,523; and 2,130,948. The polymers there described are high molecular weight products which are generally crystalline in structure showing X-ray powder diffraction patterns in the massive state, and which are capable of being cold drawn into fibers showing by characteristic X-ray patterns molecular orientation along the fiber axis.

These polyamides, generally speaking, comprise the reaction product of a polyamide-forming composition in which the molecules are bifunctional and contain two amide-forming groups, each of which is complementary to an amide-forming group in other molecules in said composition.

These polyamides as defined above or as otherwise identified hereinafter can be obtained, for example, by self-polymerization of monoaminomonocarboxylic acids, or by reacting a diamine with a dibasic carboxylic acid in substantially equimolecular amounts, it being understood that reference herein to the amino acids, diamines, and dibasic carboxylic acids is intended to include the equivalent amide-forming derivatives thereof. Amide-forming derivatives of the amino acids include the ester, anhydride, amide, lactam, acid halide, N-formyl derivatives, carbamate, and nitrile in the presence of water. Amide forming derivatives of the dibasic carboxylic acids comprise the mono- and di-ester, the anhydride, the mono- and di-amide, acid halide and the following compounds in the presence of water: nitrile, cyanocarboxylic acid, cyanoamide and cyclic imide. Amide forming derivatives of the diamines include the carbamate, N-formyl derivative and the N,N'-diformyl derivative.

While the term polyamide is inclusive of all polymeric materials which contain recurring amido groups, the term nylon is now accepted as the generic expression for those linear polyamides which may be fabricated into fibers. As referred to hereinafter nylon 66 is the polyamide derived from the condensation of hexamethylene diamine and adipic acid, nylon 6 is the polyamide derived from E-caprolactam and 66/6 nylon copolymers are interpolymers of nylon 66 and nylon 6. The possible combinations of diamines and dibasic acids as well as amino acids suitable for condensation reactions is quite large, however, for the purposes of describing the invention nylon 66 and interpolymers or copolymers of 66/6 nylon are specifically illustrated.

Relative viscosity, as used herein, is the ratio of viscosity (in centipoises) at 25° C. of a 8.4% by weight solution of polyamide in 90% formic acid (90% by weight formic acid and 10% by weight water) to the viscosity (in centipoises) at 25° C. of the 90% formic acid alone.

Various processes for the continuous polymerization of aqueous polyamide forming salt solutions, including removal of the solvent water and the volatile by-products (mostly water) of the condensation reaction, have been disclosed.

In one continuous process, U.S. Pat. No. 2,361,717 to Taylor, an aqeuous solution of the polyamide forming reactants, e.g., a diaminedicarboxylic acid salt, is supplied continuously to a reactor wherein the temperature-pressure conditions are such that formation of steam is prevented and a major portion of the salt converted to a polymer. The resulting reaction mass is then supplied continuously to a flash tube wherein temperatures sufficiently high for polymerization to continue are maintained with a gradual pressure reduction, thus, permitting the separation of water from the reaction mass as steam. Finally, the reaction mass is fed continuously to a heated finisher where the polymerization is completed to the extent desired.

In another continuous process, U.S. Pat. No. 2,689,839 to Heckert, an aqueous solution of the polyamide forming reactants is fed continuously through a vented jacketed vessel wherein the temperature-pressure conditions are such that a major portion of the water is removed as steam and a portion of the salt is converted to a polymer. Heckert teaches the absence of mixing in order to provide a concentration gradient in the salt solution between the inlet and the outlet of the jacketed vessel. The residual material from the jacketed vessel is fed continuously to a series of flash tubes of progressively increasing diameter and then to a heated finisher to complete the polymerization to the extent desired.

In other continuous processes, for example, in U.S. Pat. No. 3,218,297 to Sovereign and U.S. Pat. No. 3,296,217 to Tate, most of the solvent water is evaporated from the aqueous polyamide forming salt solution while the salt solution is moving as a thin annular film in a first heated zone. The major portion of the residual salt solution from the first heated zone is converted to low molecular weight polymer and most of the volatile by-products (mostly water) of the condensation reaction are evaporated from a thin annular film of the salt solution in a second heated zone at a polyamide forming temperature. The residual material from the second heated zone may then be fed to a flasher and/or a finisher to attain the desired extent of reaction.

In yet another continuous process, U.S. Pat. No. 3,185,672 to Clemo et al., a hot aqueous polyamide forming salt solution is pumped through a pressure tube at a polyamide forming temperature under a pressure at least sufficient to prevent the formation of steam and for a time such that approximately 23 to 44% of the salt is converted to low molecular weight polyamide. The resulting solution of partially reacted monomer is expanded adiabatically through a narrow orifice into a heated vessel maintained at the same temperature as the pressure tube and at substantially atmospheric pressure. The solvent water and the volatile by-products of the condensation reaction are vented through a rectifying column to recover diamine therefrom. The partially reacted monomer is then removed from the heated vessel for further polymerization in other equipment.

In these prior art processes, the removal of the major portion of the solvent water and the conversion of the major portion of the polyamide forming aqueous salt solution to low molecular weight polymer with the removal therefrom of the major portion of volatile by-products (mostly water) formed in the condensation reaction are carried out either in an unagitated zone or in separate zones with the result that expensive heat transfer facilities are required.

Surprisingly, it has now been found that the above disadvantages of the prior art processes may be overcome and the above steps carried out simultaneously, in one zone, in inexpensive facilities, by injecting a polyamide forming aqueous salt solution into a reaction zone having mixing and heating means adapted to achieve uniform mixing and rapid heat transfer; the reaction zone being maintained at a temperature and pressure adapted to allow simultaneously, the removal of solvent water and the polymerization of the major portion of the salt.

SUMMARY OF THE INVENTION

In accordance with the present invention therefore, there is provided a process for the continuous preparation of a polyamide from polyamide forming reactants comprising:
  injecting continuously polyamide forming reactants into a reaction zone designed to permit rapid heating and uniform mixing;
  heating and uniformly mixing the reactants within the reaction zone for a predetermined hold-up time and at a predetermined elevated temperature and elevated pressure to form a vapor and a prepolymer;
  continuously separating the vapor from the prepolymer so formed; and
  withdrawing the prepolymer from the reaction zone.

One embodiment of the present invention provides a process for the continuous preparation of a polyamide from a polyamide forming aqueous salt solution prepared from a diamine and a dicarboxylic acid comprising:
  injecting continuously a polyamide forming aqueous salt solution into a first reaction zone designed to permit rapid heating and uniform mixing;
  heating and uniformly mixing the salt solution within the first reaction zone for a predetermined hold-up time and at a predetermined elevated temperature and pressure to form a first vapor and a prepolymer;
  continuously venting the first vapor through a rectifying zone;
  treating the first vapor in the rectifying zone to recover from the vapor, diamine separated from the salt solution in the first reaction zone;
  passing the prepolymer from the first reaction zone into a second reaction zone;
  heating the prepolymer within the second reaction zone for a predetermined hold-up time to form a second vapor and a polymer;
  continuously separating the second vapor from the polymer so formed; and
  withdrawing the polymer from the second reaction zone.

The term "prepolymer" as used herein refers to the partially reacted polyamide forming salt solution in the first reaction zone having an extent of reaction in the range of from 70 to 98 percent and a relative viscosity in the range of about 2.3 to 11. Extent of reaction is the fraction, expressed herein as a percentage, of the reactive functional groups on the original reactants which have entered into reaction.

The present invention also provides an apparatus for the continuous preparation of a polyamide comprising:
  a heat exchanger having an inlet and an outlet;
  a separator having mid and bottom portions;
  a recirculating loop connected between the bottom of the separator and the inlet of the heat exchanger;
  a nozzle connected between the outlet of the heat exchanger and the mid portion of the separator;
  an injecting means in the recirculating loop adapted to inject a flow of polyamide forming reactants into the recirculating loop;
  a heating means in the heat exchanger adapted to partially vaporize and partially react the reactants to form a prepolymer and a vapor;
  a recirculating means adapted to recirculate the prepolymer from the bottom of the separator through the heat exchanger and back into the separator;
  control means for maintaining a constant level of prepolymer in the separator and for withdrawing a controlled flow of prepolymer therefrom;
  control means for the heating means in the heat exchanger adapted to maintain the prepolymer in the separator at a predetermined temperature; and
  control means for venting the vapor from the separator and for maintaining a predetermined pressure therein.

Another embodiment of the present invention provides an apparatus for the continuous preparation of a polyamide from a polyamide forming aqueous salt solution prepared from a diamine and a dicarboxylic acid comprising:
  a heat exchanger having an inlet and an outlet;
  a rectification column having a base-section, a top portion, and an entrance for receiving a flow of polyamide forming aqueous salt solution;
  a separator comprising the base-section of the rectification column, said separator having a bottom portion and a mid portion;
  a recirculating loop connected between the bottom of the separator and the inlet of the heat exchanger;
  a vapor pipe connected between the outlet of the heat exchanger and the mid portion of the separator;
  reflux means located within the top portion of the rectification column adapted to supply reflux to the rectification column;
  collecting means located above the separator in the rectification column adapted to collect the salt solution and reflux from the bottom of the rectification column;
  an injecting means in the recirculating loop adapted to inject the salt solution and reflux from the collecting means into the recirculating loop;
  a heating means in the heat exchanger adapted to partially vaporize and partially react the salt solution to form a prepolymer and a vapor;
  a recirculating means adapted to recirculate the prepolymer from the bottom of the separator through the heat exchanger and back into the separator;
  control means for maintaining a constant level of prepolymer in the separator and for withdrawing a controlled flow of prepolymer therefrom;
  control means for the heating means in the heat exchanger adapted to maintain the prepolymer in the separator at a predetermined temperature; and control means for venting the vapor from the separator and for maintaining a predetermined pressure therein.

DETAILED DESCRIPTION OF THE PREFERRED EMBODIMENT

Figure 1:
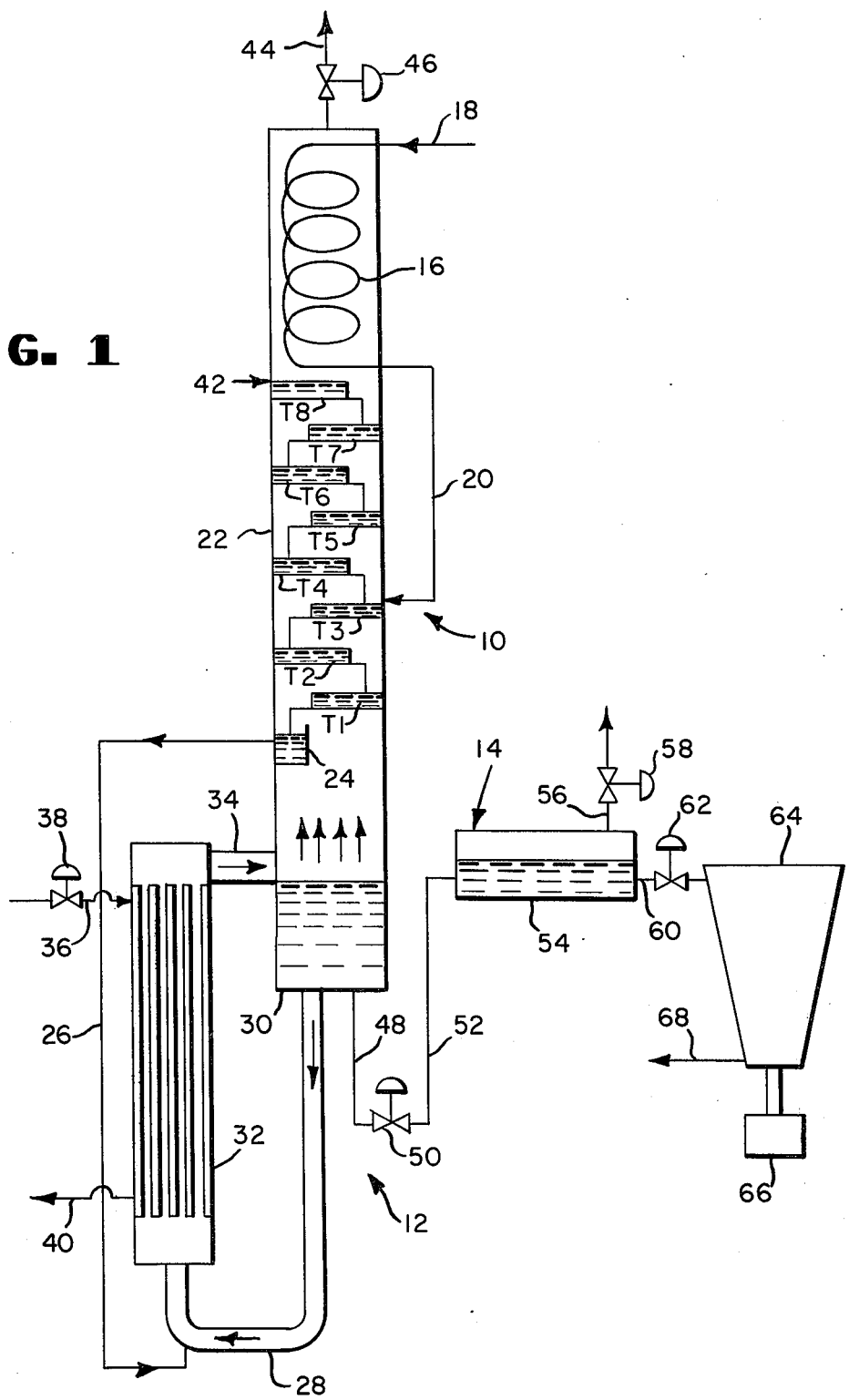
FIG. 1 is a schematic diagram showing a device suitable for carrying out one embodiment of the process of the present invention.

Referring generally to FIG. 1 of the drawings, the continuous polymerization system includes a rectifying zone 10; a first reaction zone 12 in which a polyamide forming aqueous salt solution, for example, an aqueous solution of hexamethylene diammonium adipate, is uniformly mixed, partially vaporized and partially reacted under predetermined pressure temperature conditions; and a second reaction zone 14 wherein reaction continues at a lower pressure than the first reaction zone 12. The vapor from the first reaction zone vents through the rectifying zone 10. The polymer issuing from the second reaction zone 14 passes to a finisher 64 and from there through a transfer line 68 for further processing. For example, the polymer may be fed to polymer pelletizing, fiber spinning or film extruding units.

Referring now to FIG. 1 in detail, a combination partial condenser-preheater 16 is shown in the upper portion of the rectifying zone 10. Partial condenser-preheater 16 has an inlet line 18 and a feed line 20 which connects to a mid section of a rectification column 22. The rectification column 22 has eight bubble cap trays, numbered from the bottom tray as T1 through T8. A collection pan 24 is positioned below tray 1. A liquid line 26 leads from collection pan 24 to a recirculating loop 28. The recirculating loop 28 connects the bottom of a separator 30 comprising the base section of the rectification column 22, to the bottom of a vertical thermosyphon reboiler 32. A vapor pipe 34 connects reboiler 32 at its upper end to a mid section of separator 30. An entrance line 36 with a throttle valve 38 is provided to supply heating fluid, preferably Dowtherm A for heating purposes. An exit line 40 is provided in the lower shell of reboiler 32 for removing heating fluid. A vent line 44 with a control valve 46 is provided in the top of rectifying zone 10 and an entrance line 42 is provided in column 22 above tray T8. An exit line 48 having a control valve 50 connects the bottom of separator 30 through a heated entrance line 52 (or a heat exchanger) to a boiling reactor 54 (i.e., a second reaction zone 14). A vent line 56 with a control 58 is provided in the top of boiling reactor 54. An outlet line 60 having a control valve 62 connects boiling reactor 54 to a polymer finisher 64.

In operation, a predetermined flow of a polyamide forming aqueous salt solution, preferably a 40 to 60% by weight solution of a polyamide forming salt such as hexamethylene diammonium adipate, is fed to the combination partial condenser-preheater 16 through inlet line 18. The temperature of the solution entering the partial condenser-preheater 16 is normally in the range of 25° to 50° C. and the solution is heated in the partial condenser-preheater 16 to a temperature which may approach the temperature of the vapor in the upper portion of the rectifying zone 10. The temperature of this vapor is approximately equal to the boiling point of water at the pressure being maintained in the rectifying zone 10. The rectifying zone 10 and the first reaction zone 12 are maintained at a predetermined pressure, preferably in the range of from about 160 to about 350 lb./sq. in. absolute. The partial condenser-preheater 16 also condenses a portion of the vapor in the upper portion of the rectifying zone 10 to provide reflux for the rectifying zone 10. From the partial condenser-preheater 16, the solution is fed through line 20 to a mid section of the rectification column 22. In the embodiment shown, the rectification column 22 has eight bubble cap trays and the preheated salt solution is fed on tray T3, the third tray from the bottom. The number of trays, T, may be more or less than eight and the feed line 20 may enter the column at any tray above the bottom tray and below the top tray. It will be appreciated that sieve plate trays or column packing may be substituted for the bubble cap trays.

On entering the rectification column 22, the salt solution mixes with reflux and passes down the column from tray to tray to be collected at the collection pan 24. The salt solution, diluted by the reflux, flows from the collection pan 24 through the liquid line 26 and is injected or sparged into the recirculating loop 28.

The salt solution diluted by the reflux is injected into the recirculating loop 28 directly beneath the reboiler 32. The salt solution mixes with the liquid circulating in the recirculating loop 28 and passes into the bottom of reboiler 32. In the reboiler 32, the salt solution is heated, partially vaporized and partially reacted to form a first vapor and a prepolymer, which are conducted from the top of the reboiler 32 into the separator 30 by the vapor pipe 34. The vapor rises from the separator 30 through the rectification column 22 in which the vapor is contacted with reflux and salt solution. The vapor rising from the top tray T8 contacts the partial condenser-preheater 16 and is partially condensed to produce reflux. The quantity of reflux returned to the rectification column 22 from the partial condenser-preheater 16 is governed by: the amount, concentration and temperature of the salt solution entering partial condenser-preheater 16; the pressure in the rectifying zone 10; and the temperature of the prepolymer in the separator 30, which forms the base section of column 22. The heat transfer area of the partial condenser-preheater 16 is designed so that any increase in the flow of solution increases the amount of vapor condensed as reflux. The partial condenser-preheater 16 is preferably overdesigned. The above feature automatically keeps the reflux to feed ratio in balance despite changes in feed rate of salt solution to the system. Thus, the polymerization system is less susceptable to upsets due to changes in the flow of salt solution feed than are the prior art systems. Reflux, optionally in the form of demineralized water, may also be added through entrance line 42 above tray T8. If desired, all reflux may be supplied as demineralized water. In this case, the partial condenser-preheater 16 would be eliminated and other means for preheating the salt solution provided if desired.

The uncondensed vapor is vented from the top of column 22 through the vent line 44 by the central valve 46 which also maintains the desired pressure throughout the rectifying zone 10 and the first reaction zone 12.

The salt solution diluted by the reflux is injected or sparged into the recirculating solution, preferably just prior to where the recirculating loop 28 connects to the bottom of the thermosyphon reboiler 32. In some cases, additives such as titanium dioxide may be required in the polymer and preferably these are added at the point where the line 26 joins the recirculating loop 28. Feeding the salt solution into the recirculating loop 28 at this point is important in order to promote the mixing necessary to ensure the uniformity of the prepolymer in the first reaction zone 12.

Some or all of the preheated salt solution may be injected directly into the recirculation loop 28 without the solution first passing through the rectification column 22. In the case where all of the preheated salt solution is injected directly into the recirculation loop 28, the collection pan 24 may be omitted from the rectification column 22 and the reflux and recovered diamine may be allowed to flow from tray T1 into the separator 30. It is feasible to eliminate the rectifying zone 10 entirely. In this case, the vapor rising from the separator 30 is vented directly to atmosphere. The additional diamine lost from the separator 30 may be compensated for by adding an excess of diamine in the preparation of the salt solution. However, the uniformity of the resultant polymer usually is not as good as it is where a rectifying zone 10 is provided above the first reaction zone 12. Moreover, the additional diamine lost from the separator 30 adds to the raw materials cost for the polymer and may also result in a pollution problem.

In the recirculating loop 28, the salt solution mixes with the liquid recirculating therethrough and passes into the bottom of the vertical thermosyphon reboiler 32. In the reboiler 32, the salt solution is heated, partially vaporized and partially reacted to form a first vapor and a prepolymer, which are conducted from the top of the reboiler 32 into separator 30 by the vapor pipe 34. It is the formation of vapor within the tubes of the vertical thermosyphon reboiler 32 that causes the circulation of the prepolymer from the separator 30 through the reboiler 32 and back into the separator. A uniform recirculation rate may be maintained by controlling the liquid level in the separator 30. A pump or other forced circulation means, however, may be inserted in the recirculating loop 28 to circulate the prepolymer from the separator 30 through a heat exchanger and back into the separator. In this case, the salt solution is preferably injected into the recirculating loop 28 after the pump.

The prepolymer in the separator 30 (in the first reaction zone 12) is maintained at a predetermined temperature by adjusting the throttling valve 38 in the heating fluid entrance line 36. As indicated below in Table 1, prepolymers having extents of reaction and relative viscosities over a considerable range are obtainable depending on the operating conditions selected. The values indicated in Table 1 are for the case in which the aqueous salt solution is an aqueous solution of hexamethylene diammonium adipate.

TABLE 1

| Operating Conditions | 1 | 2 | 3 |
|---|---|---|---|
| Temperature Range, ° C. | 215–290 | 220–260 | 220–245 |

TABLE 1-continued

| Operating Conditions | 1 | 2 | 3 |
|---|---|---|---|
| Hold-up Time Range, minutes | 15–400 | 40–200 | 50–150 |
| First Reaction Zone 12 Pressure Range, lb./sq. in. absolute | 160–500 | 160–350 | 160–265 |
| Prepolymer | | | |
| Extent of Reaction, Percent | 70–98 | 75–97 | 80–96.4 |
| Relative Viscosity (Approx.) | 2.3–11 | 2.4–7 | 2.5–6 |

From the bottom of the separator 30, the prepolymer is conducted by the exit line 48 to the control valve 50, which flashes it through the heated entrance line 52 (or a heat exchanger) to the boiling reactor 54, preferably a partially filled reactor, (i.e., to second reaction zone 14). The prepolymer is heated to a temperature approaching that of the boiling reactor 54 by the heated entrance line 52. A jacket heated with a heating fluid such as Dowtherm A surrounds the boiling reactor 54 and maintains a predetermined temperature in the boiling reactor 54. In the boiling reactor, the prepolymer undergoes further conversion to a second vapor and a polymer. The second vapor is vented, preferably to atmosphere through the vent line 56 by the control valve 58 which also maintains a predetermined pressure in the boiling reactor 54 (second reaction zone 14). As indicated below in Table 2, polymers having extents of reaction and relative viscosities over a considerable range are obtainable depending on the operating conditions selected. The values indicated in Table 2 are for the case in which the aqueous salt solution is an aqueous solution of hexamethylene diammonium adipate.

TABLE 2

| Operating Conditions | 1 | 2 |
|---|---|---|
| Temperature Range, ° C. | 260–300 | 270–290 |
| Hold-up Time, minutes | 5–60 | 10–25 |
| Pressure, lb./sq. in. absolute | 30–350 | 50–250 |
| Polymer | | |
| Extent of Reaction, Percent | 96.5–99 | 97–98.5 |
| Relative Viscosity (Approx.) | 6–26 | 8–15 |

The polymer is flashed from the boiling reactor 54 through the outlet line 60 and into finisher 64 by control valve 62. The pressure in finisher 64, which is lower than the pressure in the boiling reactor 54, may be at atmospheric pressure or may even by under a vacuum. The finisher 64 may be of the type shown by Li in U.S. Pat. No. 3,113,843, issued Dec. 10, 1963, it may be of the type disclosed by Pinney in Canadian patent application Ser. No. 114,562, filed June 1, 9171, or it may be of other types well known in the art. The polymer leaving the finisher 64 passes through transfer line 68 for further processing.

Figure 2:
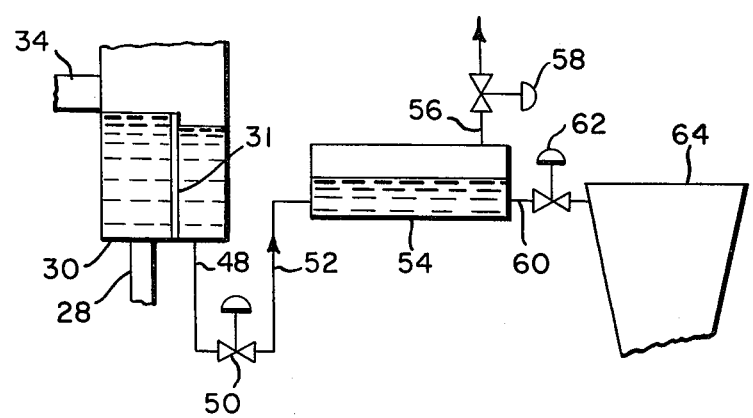
FIG. 2 is a schematic diagram showing a variation in part of the device of FIG. 1.

FIG. 2 shows a variation in the facilities of FIG. 1, wherein an overflow weir 31 is provided in the separator 30. The overflow weir 31 divides the separator 30 into two zones: a recirculating zone on the recirculating loop 28 side of the overflow weir 31 and a zone on the exit line 48 side of the overflow weir 31 in which the flow of prepolymer approaches "plug flow". The overflow weir 31 has two functions:

1. It provides a constant level in the recirculating zone, therefore, variations in level in the plug flow zone have no effect on the circulating rate through the recirculating loop and thermosyphon reboiler; and
2. It provides a reactor wherein the polymerization reaction is allowed to more closely approach equilibrium.

Figure 3:
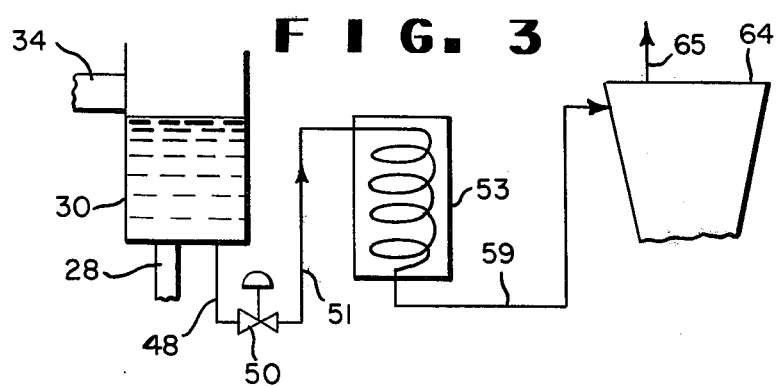
FIG. 3 is a schematic diagram showing another variation in part of the device of FIG. 1.

FIG. 3 shows another variation in the facilities of FIG. 1, wherein a flasher 53 is substituted for the boiling reactor 54 of FIG. 1. The flasher 53 may be a tubular reaction vessel of progressively increasing diameter inside of a jacket which is heated with a heating fluid such as Dowtherm A. From the bottom of the separator 30, the prepolymer is conducted by the exit line 48 to the control valve 50, through which it is flashed via an entrance line 51 to flasher 53. It will be appreciated that a pump may be substituted for the control valve 50 to boost the pressure if the flasher 53 is designed to have a high pressure drop across it. An outlet line 59 conducts the polymer and the second vapor from the outlet of the flasher 53 into the polymer finisher 64. The entrance line 51 and the outlet line 59 to and from the flasher 53 are preferably as short as possible. A vent line 65 conducts the second vapor from the top of the finisher 64 to atmosphere or, if desired, to a source of vacuum. The polymer is conducted from the finisher as described heretofore.

Figure 4:
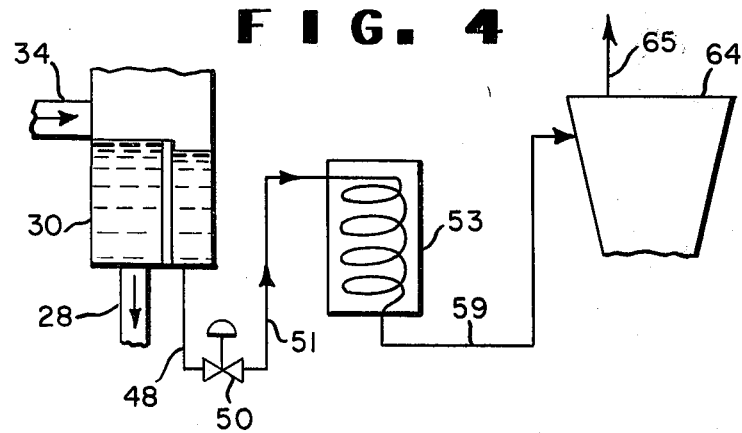
FIG. 4 is a schematic diagram showing yet another variation in part of the device of FIG. 1.

FIG. 4 shows yet another variation in the facilities of FIG. 1, wherein the overflow weir 31 in the separator 30 (shown in FIG. 2 and described above) is combined with the flasher 53 (shown in FIG. 3 and described above). In certain instances, the flasher 53 may be omitted from the facilities of FIG. 4 and the prepolymer may be conducted from the bottom of separator 30 and flashed through a heated entrance line directly into finisher 64.

In the embodiments of the present invention shown in the drawings and described above, the first reaction zone is depicted as a zone in which rapid heating and uniform mixing is achieved by the recirculation of prepolymer from a separator through a heat exchanger and back into the separator. Recirculation of a prepolymer occurs either (1) because the heat exchanger is a thermosyphon reboiler; or (2) because a pump is installed in the recirculating loop between the separator and the reboiler. In each of the above cases, the aqueous polyamide forming salt solution is fed to the first reaction zone at a position designed to promote rapid mixing of the salt solution with the recirculating prepolymer. It is feasible to use other apparatus as a first reaction zone. The essential features required in such apparatus are as follows:

1. it must be designed to allow rapid heating and uniform mixing of prepolymer within the reaction zone; and
2. it must be designed so that the aqueous polyamide forming salt solution is fed into the first reaction zone at a position such that rapid mixing of the salt solution with the prepolymer is achieved.

The following examples illustrate the present invention without limiting its scope:

EXAMPLE I

A nylon polymer was prepared from a 50.5% by weight aqueous solution of hexamethylene diammonium adipate (containing appropriate textile additives) in a polymerization apparatus as hereinbefore described and illustrated in FIG. 1.

The 50.5% by weight aqueous solution of hexamethylene diammonium adipate (salt solution) was fed through the entrance line 18 to the partial condenser-preheater 16 at the rate of 151.6 lb./hr. and was preheated therein to 196° C. by condensing 59.5 lb./hr. of vapor rising from the top tray of a six-tray (bubble cap) rectification column 22 as reflux. The preheated salt solution was fed through the line 20 on the 3rd tray from the bottom of the rectification column 22. The salt solution and reflux was collected on the collection tray 24 and passed by gravity through the line 26 and injected (as an approx. 36% by weight aqueous solution) into the recirculating loop 28 beneath the vertical thermosyphon reboiler 32. A delusterant was injected into the salt solution and reflux just prior to its entry into the recirculating loop 28.

The pressure in the rectifying zone 10 and first reaction zone 12 was maintained at 225 lb./sq. in. absolute by the control valve 46, the temperature in the separator 30 was maintained at 228° C. by adjusting the flow of heating fluid, Dowtherm A, using throttling valve 38 and the average hold-up time in the separator 30 was 53.4 minutes. The prepolymer leaving the seprator 30 by exit line 48 had approximately the following characteristics:

1. a relative viscosity of 4.5;
2. a water content of 10% by weight; and
3. an extent of reaction of 91%.

The vapor leaving the top of the separator 30 (and entering the rectification column 22) contained 1.46% hexamethylene diamine, and the vapor venting from vent line 44 contained only 0.14% hexamethylene diamine.

The prepolymer leaving the separator 30 through the exit line 48 was let down by the control valve 50 through the heated entrance line 52 into the horizontal boiling reactor 54 which was maintained at 120 lb./sq. in. absolute by the control valve 58 in the vent line 56. The temperature of the prepolymer was raised to 272° C. in the heated entrance line 52. After 29 minutes residence (hold-up) time in the boiling reactor 54, the polymer had the following characteristics:

1. relative viscosity of 9.9; and
2. a water content of about 1.7% by weight.

The vapor from vent line 56 contained 1.13% hexamethylene diamine. The concentration of unreacted amine groups in the polymer was approximately 44 gram equivalents per million grams of mixture less than the concentration of unreacted carboxyl groups.

The polymer from the boiling reactor 54 was flashed through the outlet line 60 by control valve 62 into the finisher 64 operated at a pressure of 800 mm. of Hg absolute. The polymer leaving the finisher 64 through transfer line 68 had a relative viscosity of 41.6. Particulate nylon 66 resin was produced at the rate of 66.2 lb./hr. from the polymer and melt spun to produce a textile yarn of high quality and uniformity.

EXAMPLE II

A nylon polymer was prepared from 50.5% by weight aqueous solution of hexamethylene diammonium adipate as hereinbefore described and illustrated in FIGS. 1 and 3. FIG. 3 illustrates modifications made in the second reaction zone 14 of FIG. 1.

In the rectifying zone 10 and the first reaction zone 12, the configuration of the equipment and the process conditions were the same as in Example I except that the temperature in the separator 30 was 226° C. instead of 228° C., and that the average hold-up time in the separator 30 was 57 minutes instead of 53.4 minutes. The prepolymer leaving the separator 30 by the exit line 48 had approximately the following characteristics:
 1. a relative viscosity of 4.5;
 2. a water content of 10% by weight; and
 3. an extent of reaction of 91%.

The prepolymer leaving the separator 30, through the exit line 48, was let down by the control valve 50 through the entrance line 51 to the flasher 53. The residence time (hold-up time) in the flasher 53 was 19 minutes, the pressure drop through the flasher 53 was 68 lb./sq. in. and the temperature of the polymer at the end of the flasher 53 was 274° C. This polymer, which was then fed to the polymer finisher 64 of Example I, had a water concentration of about 1.7%. This water concentration was the same as the concentration in the polymer leaving the boiling reactor 54 in Example I.

EXAMPLE III

A nylon polymer was prepared from a 50.5% by weight solution of hexamethylene diammonium adipate as hereinbefore described and illustrated in FIGS. 1 and 4. FIG. 4 illustrates modifications made in the separator 30 and in the second reaction 14 of FIG. 1.

The 50.5% by weight salt solution was fed through the entrance line 18 to the partial condenser-preheater 16 at the rate of 140 lb./hr. and was preheated therein to 205° C. by condensing 56 lb./hr. of vapor rising from the top tray of a 12-tray bubble cap rectification column 22 as reflux. The preheated salt solution was fed through the line 20 onto the 7th tray from the bottom of the rectification column 22. The salt solution and reflux was collected on the collection pan 24 and passed by gravity through the line 26 and injected at approximately a 38% concentration into the recirculating loop 28 beneath the vertical thermosyphon reboiler 32.

Overflow weir 31 (see FIG. 4) divides separator 30 into two zones: a recirculating zone on the recirculating loop 28 side of the overflow weir 31 and a plug flow zone on the exit line 48 side of the overflow weir 31.

The pressure in the rectifying zone 10 and first reaction zone 12 was maintained at 265 lb./sq. in. absolute by the central valve 46, the temperature in the separator 30 was maintained at 230° C. by adjusting the flow of heating fluid, Dowtherm A, using throttling valve 38 and the average hold-up time in the recirculating zone side of the separator 30 was approximately 60 minutes. Prepolymer having an extent of reaction of 92.8%, a relative viscosity of about 3.6 and a concentration of 89% flowed over the overflow weir 31 into the plug flow zone of separator 30. The hold-up time in the plug flow zone was 20 minutes. The polymer leaving the separator 30 by the exit line 48 had the following characteristics:
 1. an extent of reaction of 95.9%;
 2. a relative viscosity of about 5.8; and
 3. a water content of 11% by weight.

The polymer leaving the separator 30 through exit line 48 was let down by the control valve 50 through the entrance line 51 into the flasher 53. The hold-up time in the flasher 53 was 23 minutes, the pressure drop through the flasher 53 was 180 lb./sq. in. and the temperature of the polymer at the exit end of the flasher was 280° C. This polymer, which was then fed to the polymer finisher 64 of Example I, had a relative viscosity of about 10.

The polymer produced from this process was of excellent quality. Whiteness of polymer due to a low level of degradation by-products was particularly obvious.

EXAMPLE IV

A nylon polymer was prepared from a 50.5% by weight solution of hexamethylene ammonium adipate as hereinbefore described and illustrated in FIGS. 1 and 4 and from molten E-caprolactam.

Operating conditions were similar to Example III except that 71.9 lb./hr. of 50.5% weight salt solution was fed through entrance line 18, reflux vapor rate was proportionately reduced and 9.1 lb./hr. of molten E-caprolactam at about 230° C. was injected through line 26 into the recirculating loop 28.

Pressure in the rectifying zone 10 and reaction zone 12 was 250 psia and temperature in the separator 30 was 230° C. average hold-up time in the recirculating zone side of the separator 30 was about 103 minutes and in the plug flow about 35 minutes.

Hold-up time in the flasher 53 was 32 minutes and the temperature at the exit end was 278° C. Hold-up time in the finisher 64 was about 45 minutes at a pressure of 220 torr and at 278° to 283° and in the discharge transfer line 68 at 284° C. for 17 minutes.

The product was a random 66/6 nylon copolymer having a relative viscosity of 53.

EXAMPLE V

The operating conditions of Example IV were maintained without change except that the E-caprolactam was pumped in through entrance line 18 along with hexamethylene ammonium adipate solution.

Random 66/6 nylon copolymer having a relative viscosity varying from 52 to 58 was produced. It had a melt point of 220° C. and physical properties the same as those of similar copolymers made in batch autoclaves.

EXAMPLE VI

The operating conditions of Example IV were maintained without change except that the E-caprolactam was pumped in at the mid-point of flasher 53 and finisher 64 operating pressure was 320 torr.

The product was a 66/6 nylon block copolymer containing 10% by weight E-caprolactam. Its melt point was 259° C., relative viscosity was 51 and physical properties were very similar to 66 nylon. A material balance on the E-caprolactam injected shows that about half of it was lost as vapor through the finisher vent line 65.

What is claimed is:

1. Apparatus for the continuous preparation of a polyamide from a polyamide forming aqueous salt solution prepared from a diamine and a dicarboxylic acid comprising:

rectification column having a base section, a top portion, and a mid-section;

a combination partial condenser-preheater which is located within said top portion and has an inlet line for the polyamide forming aqueous salt solution and a line for feeding the salt solution from the condenser-preheater to the column mid-section, and which is for condensing a portion of vapor in the top portion of the rectification column for reflux and for simultaneously preheating the polyamide forming aqueous salt solution to be fed to said mid-section;

a separator comprising the base section of the rectification column, said separator having a bottom portion and a midportion;

a vertical thermosyphon reboiler having a bottom and an upper end;

a recirculating loop connecting the bottom of the separator to the bottom of the reboiler;

a vapor pipe connecting the reboiler at its upper end to the midportion of the separator;

collecting means located in the column above the separator for collecting salt solution mixed with reflux from the mid-section of the rectification column;

injecting means for injecting the salt solution and reflux from the collecting means into the recirculating loop connecting the bottom of the separator to the bottom of the reboiler;

a vent line in the top portion of the rectification column for venting uncondensed vapor;

control means for venting uncondensed vapor from the separator through the vent line in the top portion of the rectification column and for maintaining a predetermined pressure therein;

an exit line connected to the bottom portion of the separator;

control means for maintaining a constant level of prepolymer in the separator and for withdrawing a controlled flow of prepolymer through the exit line;

heating means in the reboiler for partially vaporizing and partially reacting the salt solution to form a prepolymer and a vapor; and control means for the heating means in the reboiler for maintaining the prepolymer in the separator at a predetermined temperature.

2. The apparatus of claim 1 including in the separator an overflow weir which divides the separator into a recirculating section on the recirculating loop side of the overflow weir and a plug flow section on the exit line side of the weir.

3. The apparatus of claim 1 wherein the rectification column has at least three bubble cap trays including a top tray and a bottom tray which are located in the column mid-section, and the line for feeding the salt solution from the preheater-condenser to the column mid-section enters the mid-section at any tray above the bottom tray and below the top tray.

4. The apparatus of claim 3 wherein the collecting means is a collection pan positioned below the bottom tray and the injection means is a liquid line which leads from the collection pan to the recirculating loop.

* * * * *